United States Patent [19]

Weinhold

[11] Patent Number: 4,687,234
[45] Date of Patent: Aug. 18, 1987

[54] CONNECTION COUPLING

[76] Inventor: Karl Weinhold, Im Jagdfeld 43, 4040 Neuss 1, Fed. Rep. of Germany

[21] Appl. No.: 905,453

[22] Filed: Sep. 10, 1986

[30] Foreign Application Priority Data

Sep. 12, 1985 [DE] Fed. Rep. of Germany ....... 3532505

[51] Int. Cl.⁴ ............................................. F16L 33/12
[52] U.S. Cl. ................................... 285/244; 285/252; 285/174; 24/270
[58] Field of Search .............. 285/243, 244, 252, 318, 285/409, 420; 24/270, 271, 273, 19, 20 S, 483

[56] References Cited

U.S. PATENT DOCUMENTS

| | | | |
|---|---|---|---|
| 319,516 | 6/1885 | Shank | 24/270 |
| 2,942,127 | 6/1960 | Harse | 24/19 |
| 2,973,973 | 3/1961 | Borth | 285/252 |
| 3,218,095 | 11/1965 | Wiltse | 285/318 |
| 3,303,669 | 2/1967 | Oetiker | 285/252 |
| 3,712,647 | 1/1973 | Stecher | 285/318 |
| 4,152,016 | 5/1979 | Weinhold | 285/243 |
| 4,296,534 | 10/1981 | Nagano | 285/252 |
| 4,480,359 | 11/1984 | Koster | 24/270 |
| 4,556,241 | 12/1985 | Weinhold | 285/252 |

FOREIGN PATENT DOCUMENTS 669253 11/1929 France .
150972 8/1955 Switzerland ........................ 285/409

Primary Examiner—Cornelius J. Husar
Assistant Examiner—Anthony Knight
Attorney, Agent, or Firm—Kerkam, Stowell, Kondracki & Clarke

[57] ABSTRACT

The present invention relates to a connection coupling for fixing thin-walled hoses on a hose nipple. In the outer circumference of the hose nipple is formed an annular groove into which is pressed the hose pushed onto the hose nipple by means of a collar compressed by the coupling bolt lever lock, said bolt lever lock being fixed rotatably around an axis at said collar, said collar comprising a portion formed of a helical spring. The invention is characterized in that (a) a portion of said collar is formed of a half shell (4) comprising a central internal squeezed circumferential bead,
(b) bolt lever lock (5) is articulated at one hand to half shell (4) and on the other hand to helical spring (6),
(c) the length of helical spring (6) and the location of its fixing points (11, 13) at half shell (4) and at bolt lever lock (5) is adapted to an uninterrupted compression in closed condition also in the range of bolt lever lock (5).

11 Claims, 9 Drawing Figures

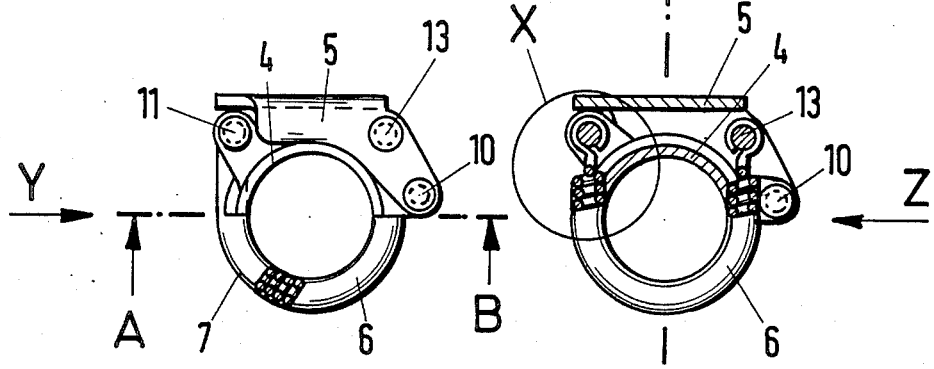
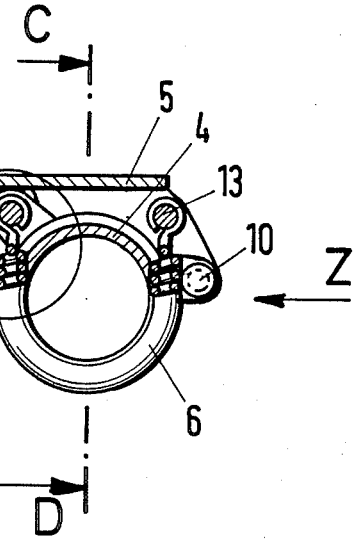
Fig. 1
Fig. 2
Fig. 3
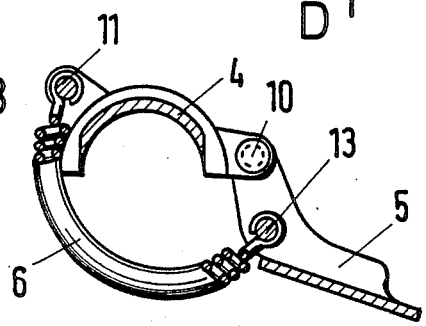
Fig. 4
(C-D)
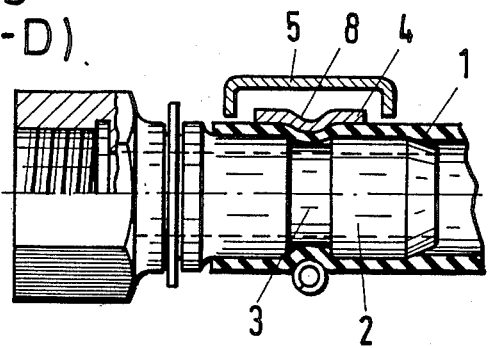

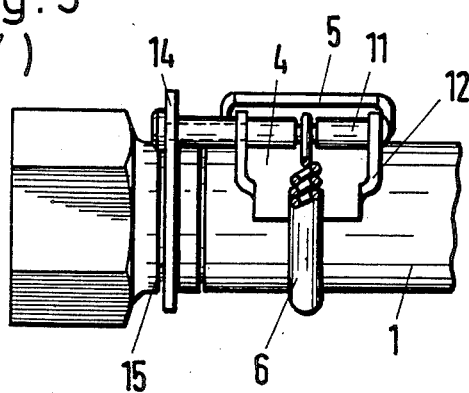
Fig. 5 (Y)
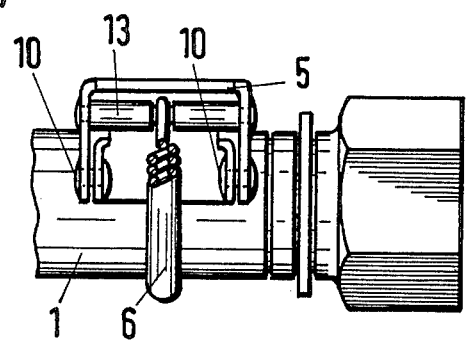
Fig. 6 (Z)
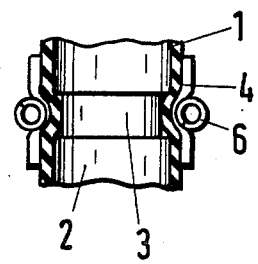
Fig. 7 (A-B)

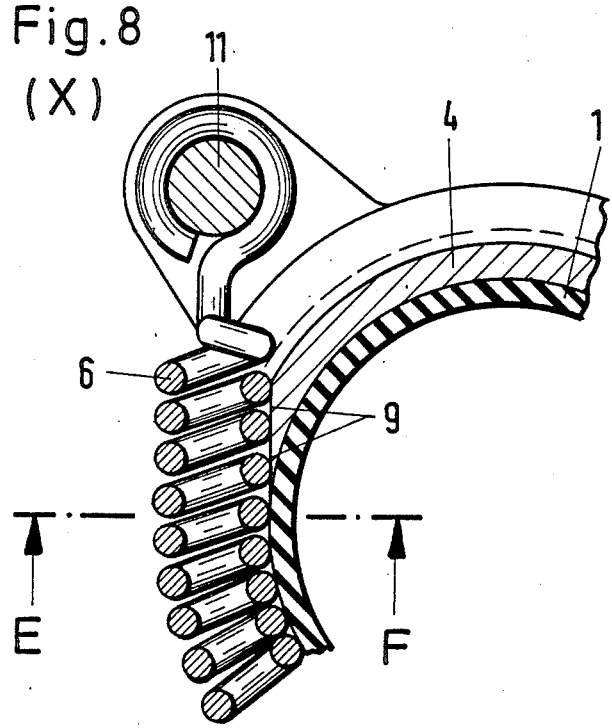
Fig. 8 (X)
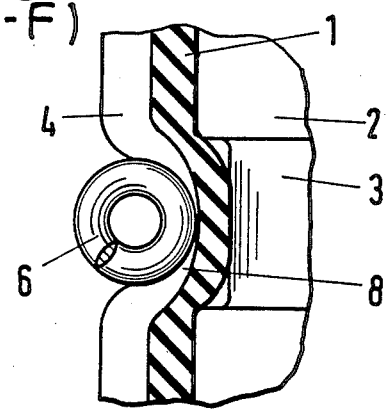
Fig. 9 (E-F)

CONNECTION COUPLING

The present invention relates to a connection coupling for fixing thin-walled hoses on a hose nipple in the outer circumference of which is formed an annular groove into which is pressed said hose pushed on said hose nipple by means of a coupling collar compressable by a bolt lever lock, wherein said bolt lever of the lock is rotatably fixed around an axis at said collar and said collar comprises a portion formed of a helical spring.

A connection coupling comprising these features is known from French patent specification No. 669,253.

Furthermore, for the purpose of fixing hoses pushed onto hose nipples, collars are known which are formed of half shell type upper and lower portions compressed by means of a bolt lever around that portion of the hose pushed onto the hose nipple. These half shells are undetacheably fixed to the hose nipple by being connected by means of a bolt to a ring rotatably inserted into a groove on the hose nipple provided in front of the hose end where the groove does not interfere with the hose itself. But said prior hose couplings are less suitable for fixing thin-walled hoses on a hose nipple, since in case of thin-walled hoses there exists an increased risk that the hose is damaged during the clamping process or that there are formed wrinkles whereby the connection may become untight. Economical and fabrication problems also play an important role. Fixing of thin-walled hoses on hose nipple necessitates simple design and cheap fabrication.

In the connection coupling disclosed by French patent specification No. 669,243 the collar portion formed by a helical spring is provided in a circumferential section located in spaced relationship to the bolt lever lock, while the other collar portions comprise simply sections of a circumferential band. Compression of the hose in the annular groove of the hose nipple in the area below the bolt lever lock is ensured by no specific means.

It is therefore an object of the present invention to provide a connection coupling for thin-walled hoses permitting secure and non-destructive clamping of thin-walled hoses on hose nipples.

For solving said object, the present invention provides a connection coupling comprising the features indicated in claim 1. According to these features the inventive connection coupling consists of three portions, i.e. a half shell, bolt lever and a helical spring. Said three portions are of simple design and cheap in fabrication and may be easily assembled into a connection coupling. Manipulation is simple and ensures secure clamping of thin-walled hoses on hose nipples, in particular also in the area below the bolt lever lock.

According to an advantageous embodiment of the inventive connection coupling the ends of the half shell are provided with a sharp-edged reduction. This avoids the formation of wrinkles during clamping of the hose. Said sharp edge produced during forming of the reduction may also be rounded.

By enclosing the helical spring in a plastic casing, friction between the helical spring and the hose occurring when tensioning and unloading the helical spring during closing and opening processes is reduced.

In order to ensure secure compression of the hose by the helical spring into the annular groove provided in the hose nipple, the diameter of the helical spring must be smaller than the width of the annular groove. If the radius of the circumferential bead in the half shell corresponds to the radius of the helical spring, said helical spring is laterally supported and guided at the discharge ends of the half shell. This also avoids canting of the coupling. For reasons of stability, it is recommended to centrally fix the helical spring at the half shell.

According to another advantageous embodiment of the invention the connection coupling is undetachably fixed to the hose nipple by the fact that the half shell is connected by means of a bolt to a ring rotably inserted into a groove in the mouthpiece located in front of the hose end.

The drawing shows several views and sections of the inventive connection coupling. The invention is explained in detail by means of said drawing, wherein FIG. 1 is a front elevation;

FIG. 2 is a partial section of the front elevation, with the coupling in a closed condition;

FIG. 3 is a partial section with the coupling in an open condition;

FIG. 4 is a longitudinal section generally along line C-D of FIG. 2, but also depicting the hose nipple and the hose;

FIG. 5 is a side elevation generally along direction Y of FIG. 1, but also depicting a hose covering the hose nipple;

FIG. 6 is a side elevation generally along direction Z of FIG. 1, but also depicting a hose covering the hose nipple;

FIG. 7 is a section generally along line A-B of FIG. 1, but also depicting portions of the hose nipple and the hose;

FIG. 8 depicts in enlarged detail portion X of FIG. 2, but also including a portion of the hose; and FIG. 9 is a section generally along line E-F of FIG. 8, but also including a portion of the hose nipple.

The represented connection coupling for fixing a thin-walled hose 1 on hose nipple 2 provided with an annular circumferential groove 3, consists of half shell 4, bolt lever 5 and helical spring 6. Said helical spring 6 may be protected by a plastic casing 7.

Half shell 4 is provided with a centrally located radially inward circumferential depression 8 formed such as by squeezing to produce an internal bead located in a sectional plane with the annular circumferential groove 3 in hose nipple 2. The circumferential ends of half shell 4 are provided with sharp-edged reductions 9, whereby helical spring 6 is guided better and the forming of wrinkles at the hose is avoided.

Bolt lever 5 is tiltably connected around axis 10 at half shell 4 (FIGS. 1, 3 and 6). FIGS. 1 and 2 show the closed condition of bolt lever 5 and FIG. 3 shows the open condition with bolt lever 5 tilted away from half shell 4.

One end of helical spring 6 is fixed to a bolt 11 secured at eyes 12 of half shell 4. The other end of helical spring 6 is fixed to bolt 13 at bolt lever 5.

FIG. 5 shows the undetachable fixing of the connection coupling at the hose nipple. For this purpose bolt 11 is extended and fixed to a ring 14 rotably inserted into a groove 15 in mouthpiece 2 in front of the hose end.

I claim:
1. Connection coupling comprising:
   a bolt lever lock for fixing a thin-walled hose on a hose nipple, the outer circumference of which is provided with an annular groove (3) into which is pressed said hose pushed on said hose nipple by means of a coupling collar compressable by said bolt lever lock, said bolt lever of said lock being tiltably fixed at said collar and said collar comprising a portion formed of a helical spring (6);

one portion of said collar being formed of a half shell (4) with a radially inward circumferential depression (8) producing an internal circumferential bead, and the ends of the half shell (4) being provided with a sharp-edged reduction (9);

said bolt lever lock (5) being articulated at one end to said helical spring (6); and the length of said helical spring (6) and the location of its fixing points (11, 13) at half shell (4) and at bolt lever lock (5) being selected such that there is a continuous circumferential compression of the hose, including that portion generally adjacent to said bolt lever lock.

2. Connection coupling as defined by claim 1, wherein the diameter of said helical spring (6) is less than the width of the annular groove (3).

3. Connection coupling as defined by claim 1, wherein the radius of the circumferential depression (8) in said half shell (4) is adapted to the radius of said helical spring (6).

4. Connection coupling as defined by claim 1, wherein said helical spring (6) is coaxially fixed to said half shell (4).

5. Connection coupling as defined by claim 1, wherein said connection coupling is undetachably fixed to hose nipple (2) by the fact that half shell (4) is connected through a bolt to a ring (14) rotably provided in a groove (15) in hose nipple (2).

6. Connection coupling as defined in claim 1, wherein said helical spring (6) is provided with a plastic casing (7).

7. Connection coupling comprising:

a bolt lever lock for fixing a thin-walled hose on a hose nipple, the outer circumference of which is provided with an annular groove (3) into which is pressed said hose pushed on said hose nipple by means of a coupling collar compressable by said bolt lever lock, said bolt lever of said lock being tiltably fixed at said collar and said collar comprising a portion formed of a helical spring (6), said helical spring (6) being provided with a plastic casing (7);

one portion of said collar being formed of a half shell (4) with a radially inward circumferential depression (8) producing an internal circumferential bead;

said bolt lever lock (5) being articulated at one end to said helical spring (6); and the length of said helical spring (6) and the location of its fixing points (11, 13) at half shell (4) and at bolt lever lock (5) being selected such that there is a continuous circumferential compression of the hose, including that portion generally adjacent to said bolt lever lock.

8. Connection coupling as defined by claim 7, wherein the diameter of said helical spring (6) is less than the width of the annular groove (3).

9. Connection coupling as defined by claim 7, wherein the radius of the circumferential bead (8) in said half shell (4) is adapted to the radius of said helical spring (6).

10. Connection coupling as defined by claim 7, wherein said helical spring (6) is coaxially fixed to said half shell (4).

11. Connection coupling as defined by claim 7, wherein said connection coupling is undetachably fixed to hose nipple (2) by the fact that half shell (4) is connected through a bolt to a ring (14) rotably provided in a groove (15) in hose nipple (2).

* * * * *